United States Patent [19]
Price

[11] 3,855,706
[45] Dec. 24, 1974

[54] RADIO NAVIGATION PLOTTER

[76] Inventor: Richard J. Price, 626 N.E. 7th Ave., Boynton Beach, Fla. 33435

[22] Filed: Mar. 15, 1973

[21] Appl. No.: 341,711

Related U.S. Application Data

[63] Continuation-in-part of Ser. No. 227,975, Feb. 22, 1972, Pat. No. 3,813,783.

[52] U.S. Cl. .......... 33/1 SD, 33/76 VA, 235/61 NV
[51] Int. Cl. ............................................ G01c 21/20
[58] Field of Search..... 33/1 SD, 1 CC, 1 MP, 1 SB, 33/76 VA; 235/61 NV

[56] References Cited
UNITED STATES PATENTS

| | | | |
|---|---|---|---|
| 1,294,768 | 2/1919 | Carlson | 33/76 VA |
| 2,904,885 | 9/1959 | Wood | 235/61 NV |
| 2,996,242 | 8/1961 | Bannister | 33/1 SD |
| 3,271,866 | 9/1966 | Gruber et al | 33/76 VA |
| 3,665,607 | 5/1972 | Clark | 33/1 SD |

FOREIGN PATENTS OR APPLICATIONS
730,843   5/1932   France ............................. 33/76 VA

*Primary Examiner*—Louis R. Prince
*Assistant Examiner*—Richard R. Stearns
*Attorney, Agent, or Firm*—Oltman and Flynn

[57] ABSTRACT

A radio navigation plotter having a disc which is adjustable to add in the magnetic heading of the craft to the relative bearing, as determined by a radio compass, so as to give the magnetic bearing. The plotter also has a plate which is adjustable to facilitate the landing of an aircraft for either a left or a right traffic pattern at an airport. Also, the plotter has a slide rule arrangement for computing the speed between fixes or for computing the wind correction angle to compensate for a cross wind.

5 Claims, 4 Drawing Figures

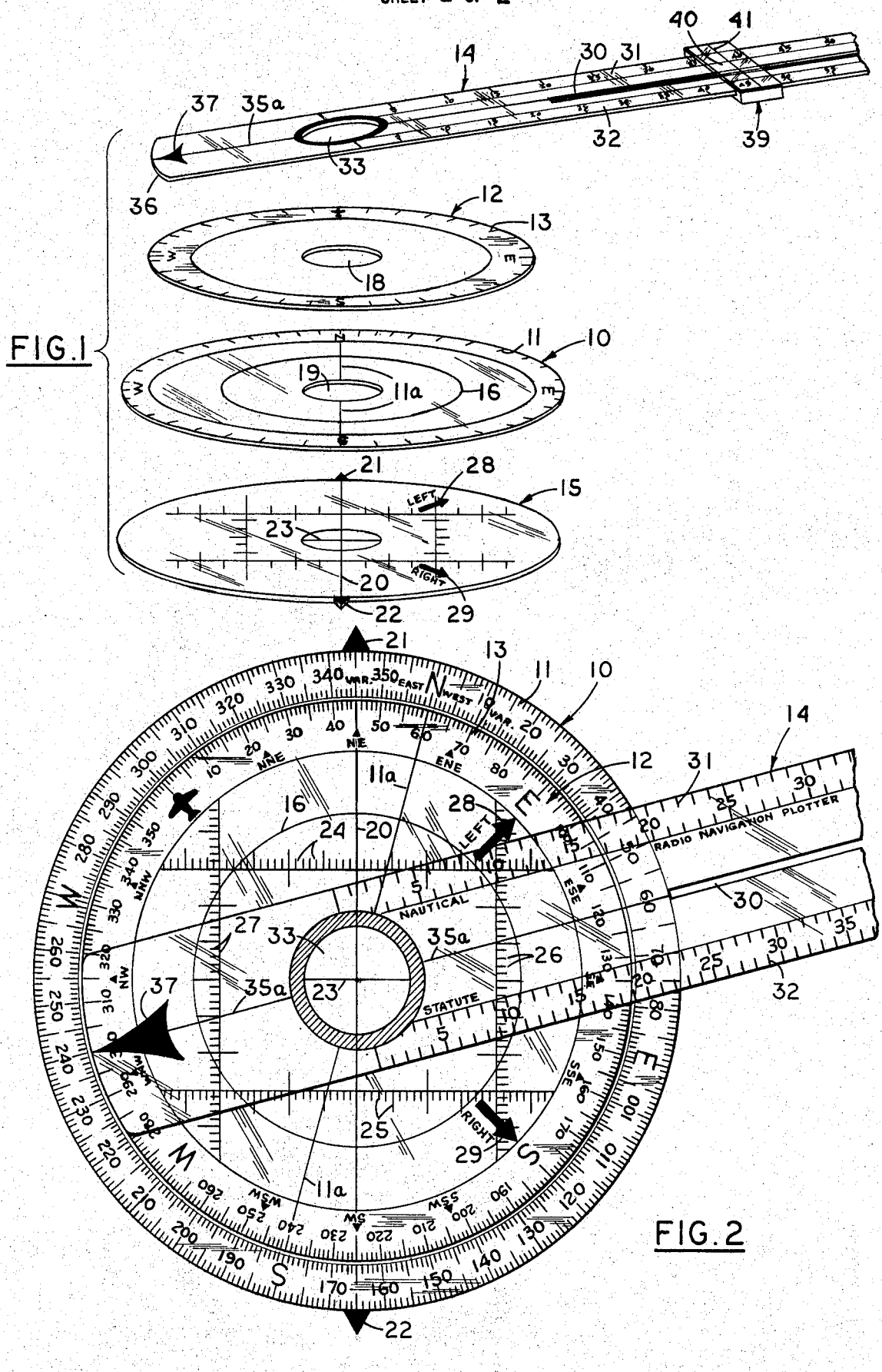

RADIO NAVIGATION PLOTTER

This application is a continuation-in-part of my co-pending U.S. patent application, Ser. No. 227,975, now U.S. Pat. No. 3,813,783, filed Feb. 22, 1972, and contains subject matter additional to that disclosed and claimed in said earlier-filed application.

This invention relates to improvements in a radio navigation plotter of the type disclosed and claimed in my aforementioned earlier-filed patent application.

A principal general object of the present invention is to retain all of the advantageous features of the plotter disclosed in my earlier application and to add new features which enhance the practical usefulness of the plotter by further reducing the mental calculations needed for successful radio navigation under various circumstances.

An important object of this invention is to provide a radio navigation plotter having a novel arrangement for computing the magnetic bearing from the relative bearing and the magnetic heading.

Another object of this invention is to provide a novel and improved radio navigation plotter which incorporates a circular slide rule arrangement for computing the speed of an aircraft or for computing the wind correction angle necessary to compensate for a cross wind.

Another object of this invention is to provide an improved radio navigation plotter having novel provision for facilitating the landing of an aircraft according to the prescribed landing pattern at the airport the pilot has chosen.

Further objects and advantages of this invention will be apparent from the following detailed description of a presently-preferred embodiment thereof, shown in the accompanying drawing in which:

FIG. 1 is an exploded perspective view of the present plotter;

FIG. 2 is a top plan view of this plotter;

Figure 4:
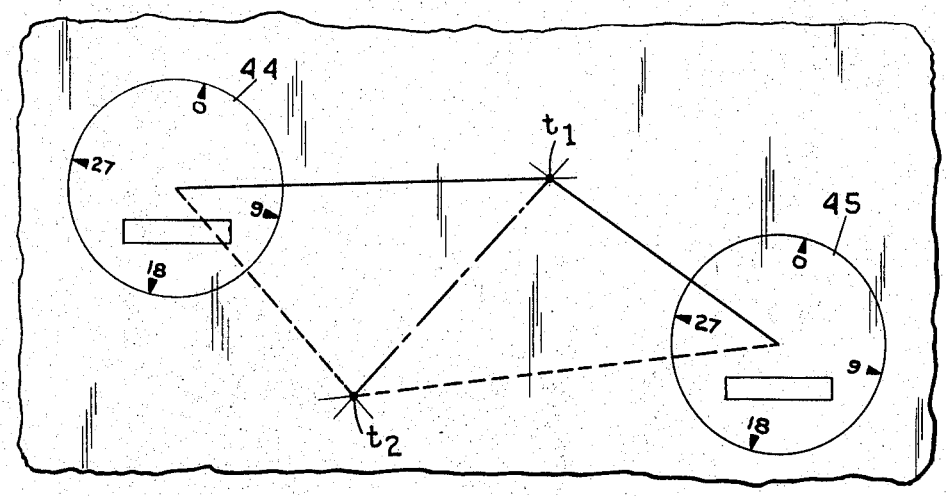

FIB. 3 is a bottom plan view of the front plate and the inner disc in this plotter, showing the circular slide rule which they provide; and FIG. 4 illustrates schematically the plotting of successive fixes from the signals broadcast by OMNI stations depicted on a Sectional Chart.

Referring first to FIG. 1, in broad outline the present plotter comprises:

a transparent, circular, flat front plate 10;

a transparent, flat, circular inner disc 12 which rotatably overlies the front plate;

a transparent, elongated ruler arm 14 which rotatably overlies, and extends radially beyond, the inner disc and the front plate and is removable from them; and a transparent, circular, flat back plate 15 which underlies the front plate 10.

The front plate 10 has a 360° compass scale 11 at its circular periphery which, as best seen in FIG. 2, is calibrated in single degree intervals that increase numerically clockwise, viewed from above. This scale 11 has a North marking "N" at the 0° location, an East marking "E" at 90°, a South marking "S" at 180°, and a West marking "W" at 270°. Just clockwise from the 0° location on its scale 11, the front plate 10 has the indicia "WEST VAR," indicating variation West, and just counterclockwise from this zero degree location it has the indicia "VAR EAST," indicating variation East. The front plate has a central circular opening 19, and it has a diametrically extending North-South line 11a. Also, it has a circular line 16 which is concentric with its circular outer edge and is the same diameter as an OMNI station circle on a Sectional Chart.

The inner disc 12 directly overlies the front plate 10, and it presents a 360° compass scale 13 at its periphery which is closely spaced from the inside edge of the scale 11 on the front plate. The scale 13 on the inner disc has degree indicia which increase numerically clockwise, viewed from above. Also, the inner disc has direction markings, "N," "E," "S," and "W," located respectively at 0°, 90°, 180°, and 270° on the scale 13, as well as intermediate direction markings, such as "NE" at 45°. As shown, the inner disc 12 has a circular central opening 18 at which it is rotatably mounted concentrically on the front plate 10.

The flat, circular back plate 15 is of the same diameter as the front plate 10 and is concentric with the front plate and the inner disc. It is marked with a diametrical NOrth-South line 20, and it has pointers 21 and 22 projecting radially beyond its circular periphery at the opposite ends of this line. A shorter East-West line 23 intersects the diametrical North-South line 20 perpendicularly at the center of the back plate, so that at this center these intersecting lines provide cross hairs that faciliate positioning the plotter over a desired location on a navigation chart.

Away from its center and toward the pointer 21, the back plate 15 has a series of closely spaced, short lines 24 (FIG. 2) that extend parallel to the diametrical NOrth-South line 20. At the opposite side (toward the pointer 22) the back plate has a similar series of closely spaced, short lines 25 t3at extend parallel to line 20.

Similarly, at one side of its center the back plate has a series of closely spaced, short lines 26 that extend perpendicular to the North-South diametrical line 20; and at the opposite side of the center, the back plate has another series of closely spaced, short lines 27 extending perpendicular to the North-South diametrical line 20.

At any position of the plotter on a navigation chart, the back plate 15 may be placed with a pair of its corresponding North-South lines 24 and 25 at or close to overlying registration with a geographic North-South line on the chart, and with a pair of its corresponding East-West lines 26 and 27 at or close to overlying registration with a geographic East-West line on the chart. Consequently, these closely spaced lines 24, 25, 26 and 27 on the back plate 15 facilitate the precise positioning of the plotter on the chart, with the diametrical NOrth-South line 20 on the back plate in precise parallelism with a geographic North-South line on the chart.

The back plate has a radially outwardly extending arrow 28, with an accompanying legend "LEFT," at a 45° angle clockwise from the North-South diametrical line 20. The back plate also has a radially outwardly extending arrow 29, accompanied by the legend "RIGHT," at an angle of 45° counterclockwise with respect to line 20. These arrows 28 and 29 are disposed on opposite sides of the East-West cross hair 23 at the center of the back plate.

The elongated, radially-extending ruler arm 14 has a narrow, longitudinal slot 30 which begins at the outer edge of the front plate 10 and extends radially outward therefrom. This slot is just wide enough to receive the point of a pencil, and either edge of the slot provides a straight edge for guiding the pencil point.

Inward from this slot, the ruler arm 14 carries a transparent, circular disc 33 whose center coincides with the central intersection of the cross-hairs 20 and 23 on the back plate 15.

On opposite sides of its longitudinal slot 30 the ruler arm 14 has a first scale 31, which is calibrated to indicate nautical mileage on a Sectional Chart radially outward from the intersection of the cross-hairs 20 and 23, and a second scale 32, which is calibrated to indicate the corresponding statute mileage from this intersection.

A slider 39 (FIG. 1) with a transparent window 40 is slidably mounted on the ruler arm 14. This window has a hairline 41 which extends perpendicular to the longitudinal slot 30 and overlies the respective scales 31 and 32 on the opposite sides of this slot.

At its inner end, the arm 14 has a circular edge 36 that overlies, and registers with, the outside circular edge of the inner ring 12. An arrow head marker 37 on the arm 14 at this location is aligned with the radially-extending longitudinal slot 30 in the ruler arm.

The front plate 10 and the ruler arm 14 are pivotally coupled to the back plate 15 in any suitable manner (not shown) such that each can be turned individually about an axis located at the intersection of the cross hairs 20 and 23 on the back plate. The inner disc 12 can be turned individually about the same axis.

On opposite sides of the disc 33 the arm 14 has a radial line 35a extending between, and aligned with, slot 30 and arrow head 37.

Figure 3:
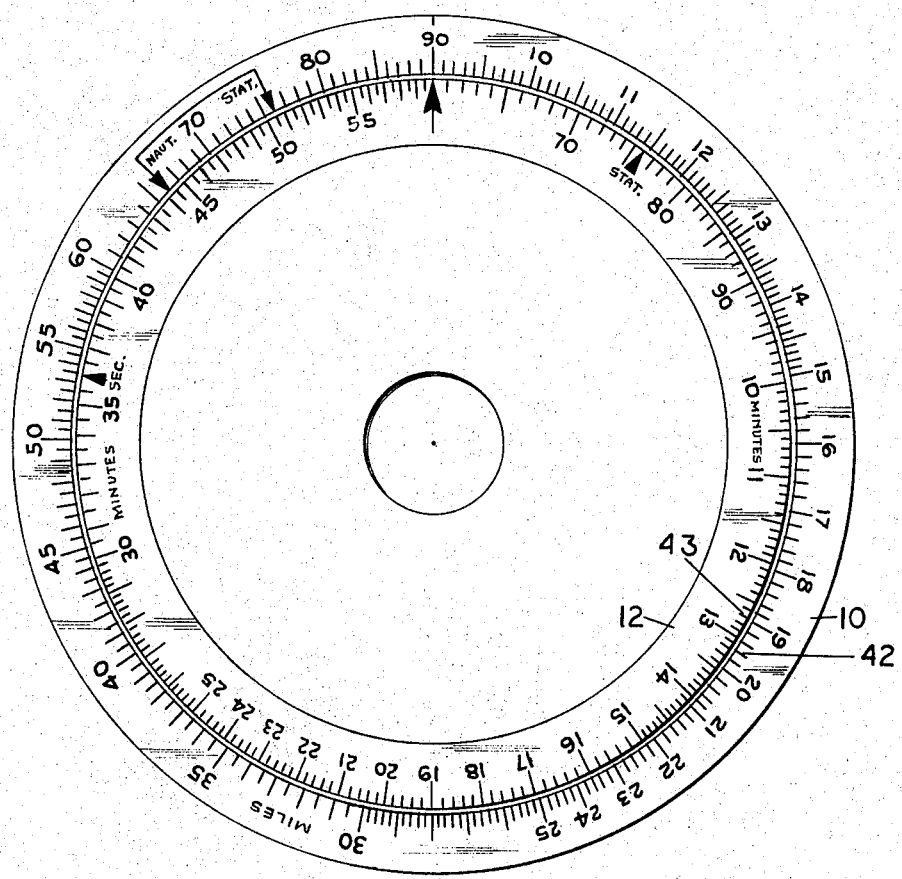

Referring to FIG. 3, the bottom of the front plate 10 carries a circular scale 42, calibrated logarithmically from 10 to 100. The bottom of the inner disc 12 carries a circular scale 43, calibrated logarithmically from 10 to 100 and closely spaced inside the scale 42 on the bottom of the front plate.

Since both the back plate 15 and the front plate 10 are transparent, the scales 42 and 43 are visible when the plotter is turned over. These two scales together provide a circular slide rule that enables the speed to be determined readily by manipulating the scales in the usual manner to divide distance by elapsed time.

Each of two neighboring OMNI (VOR) stations 44 and 45 is designated on the chart by a circle of a certain diameter, positioned with its 0° calibration pointing toward Magnetic North. Each OMNI station has a distinct broadcast frequency and each transmits 360 distinct radials, one for each degree circumferentially around the station. The zero degree radial transmitted by each station is aligned with Magnetic North at the location of that station. The radials are provided by an omnidirectional reference phase sine wave signal and a rotating variable-phase sine wave signal that is in phase with the reference phase signal only at the zero degree radial, and elsewhere is out of phase by an electrical angle equal to the angular rotational displacement of that radial from the zero degree radial.

The OMNI receiving equipment on the aircraft resolves the one radial which it receives from a selected OMNI station into a line-of-position (LOP) dial indication, which tells the displacement angle between Magnetic North and the aircraft, as measured from that OMNI station. For example, in FIG. 4 at time t-1 the aircraft is shown displaced approximately 80° from Magnetic North, as measured from OMNI station 44, and approximately 300° from Magnetic North, as measured from OMNI station 45. At a later time, t-2, the aircraft is shown displaced about 130° from Magnetic North, as measured from OMNI station 44, and about 240° from Magnetic North, as measured from OMNI station 45. Therefore, the course of the aircraft can be plotted on the chart by tuning in OMNI stations 44 and 45 in quick succession at time t-1 and noting the respective LOP readings, and later, at time t-2, tuning in these same stations in quick succession and noting the respective L readings. The position of the aircraft at time t-1 is located on the Sectional Chart by drawing pencil lines from OMNI stations 44 and 45 along the respective radials which correspond to the LOP readings from these stations at time t-1. The intersection of these two radial pencil lines is the position of the aircraft at time t-1. The same procedure is followed when the LOP readings are taken at time t-2, and for the LOP readings at subsequent times. The course of the aircraft is depicted by drawing a straight line between successive intersections of the pencil lines drawn radially from the respective OMNI stations.

The plotting of the aircraft's position from OMNI stations using conventional techniques is unnecessarily laborious and time consuming. The present plotter may be used to simplify and speed up this plotting, in a manner now to be described.

The front plate 10 in the plotter is turned to a position on the back plate 15 in which the 0–180° axis of the front plate registers with the diametrical North-South line 20 on the back plate. The plotter is placed over a selected OMNI station on the chart with the circle 16 on the front plate registering with the OMNI station circle on the chart, and with the N mark on on the front plate scale registering with the magnetic North mark on the OMNI station circle on the chart. Then, the user rotates the ruler arm 14 until its longitudinal slot 30 registers with the degree mark on scale 11 which corresponds to the LOP reading from this OMNI station. With the arm 14 held in this position, he draws a pencil line on the chart along the slot 30 radially outward from this OMNI station.

This same procedure is repeated at the second OMNI station on the chart from which an LOP reading was taken.

The intersection of the two pencil lines on the chart which extend radially outward from the two OMNI stations designates the position of the aircraft when the LOP readings were taken from these OMNI stations.

The course of the aircraft is determined by carrying out this procedure at successive times, t-1 and t-2, to get the respective intersections of the radials at these times, and then drawing a line between these intersection points.

The distance of the aircraft from either OMNI station at any plotting time can be determined by positioning the plotter as described relative to that OMNI station and then reading the appropriate scale mark on the ruler arm 14 at the position of the slider hairline 41 when it overlies the intersection of the two radial pencil lines drawn on the chart, one from that OMNI station and the other from the neighboring station.

The speed of the aircraft can be calculated as follows:

Note the respective times, t-1 and t-2, when the OMNI readings are taken. Then measure the straight-line distance on the chart between the intersection points for *t*-1 and *t*-2, respectively, which designate the chart positions of the aircraft at these times. Then divide this distance by the elapsed time between *t*-1 and *t*-2, using the distance and time scales on the bottom of the plotter.

Having determined the aircraft's actual ground speed in this manner, the estimated time of arrival at the destination, or at some intermediate point along the way, c,n be calculated.

If the aircraft carries distance measuring equipment, the position from a single VOR/TAC OMNI station may be marked on the chart simply by drawing the radial pencil line on the chart from that station, as described, and marking on that line the position of the slider hairline 41 when it is at the scale position along the arm 14 which corresponds to the distance reading given by the distance measuring equipment on the aircraft.

The present plotter also may be used in conjunction with ADF (automatic direction finding) equipment on the aircraft to plot tue course of the aircraft, or determine its position, from the radio signals transmitted by low frequency range stations or commerical radio stations. The chart markings for such stations do not have any marking which designates the direction of magnetic North.

The ADF equipment on the aircraft includes a radio compass which operates a dial indicator whose pointer tells the direction of the station from the aircraft, giving a "relative bearing" which is the number of degrees that the station is displaced clockwise from the nose of the aircraft. The gyro compass on the aircraft tells the magnetic heading of the aircraft, i.e., with respect to magnetic North. The aircraft's magnetic bearing is the sum of the foregoing relative bearing and magnetic heading.

The aircraft's magnetic bearing to the station may be set on the present plotter as follows:

Turn the inner disc 12 relative to the front plate 10 until the zero degree position on the inner disc scale 13 registers with the scale position on the front plate scale 11 that corresponds to the magnetic heading reading of the gyro compass. Then turn the elongated ruler arm 14 until its arrow head marker 37 registers with the position on the inner disc scale 13 that corresponds to the relative bearing reading given by the ADF equipment on the aircraft. The position of the arrow head marker 37 on the front plate scale 11 now gives the magnetic bearing of the aircraft to this station.

However the true geographic bearing of the aircraft to the station can be determined only after taking into account the magnetic variation at the present approximate position of the aircraft. This may be done with the present plotter by turning the back plate 15 relative to the front plate 10 to provide the correct compensation for the magnetic variation.

The Sectional Chart has magnetic variation lines thereon which tell the angular difference (in degrees of longitude East or West) between Magnetic North and true geographic North. The pilot reads from the chart the magnetic variation at his approximate present position, and then he turns the back plate 15 the same number of degrees from an angular position in which its pointer 21 registers with the zero degree "N" mark on the front plate scale 11. For example, if the magnetic variation is 7° West, he turns the back plate 15 clockwise from the aforementioned position until its pointer registers with the 7° position on the front plate scale 11. The direction of such adjustment, when the magnetic variation is West, is indicated by the legend "WEST VAR" on the front plate scale 11 just clockwise from its 0° "N" mark. Conversely, if the magnetic variation is East, the back plate 15 is turned toward the legend "VAR EAST" the corresponding number of degrees along the front plate scale 11 from the position in which its pointer 21 is at the 0° position along the front plate scale 11.

The individual adjustments of the inner disc 12 and the back plate 15 relative to the front plate 10 may be made in any desired sequence for providing as inputs to the plotter the magnetic heading (given by the gyro compass on the aircraft) and the magnetic variation, respectively. As already stated, the rotational setting of the ruler arm 14 provides as another input to the plotter the relative bearing of the aircraft (given by the ADF equipment on the aircraft).

With the plotter having been adjusted to provide all these inputs, it is placed over the station location on the Sectional Chart with the intersection of the cross-hairs 20, 23 on its back plate 15 centered over the station location and with the diametrical North-South line 20 on its back plate 15 extending parallel to the geographical North-South line on the chart. The closely spaced North-South lines 24, 25 and/or the closely spaced East-West lines 26, 27 on the back plate of the plotter facilitate such parallel positioning of the plotter. A pencil line drawn along the slot 30 in the ruler arm 14 designates the geographic bearing of the aircraft to this station.

Any significant cross wind will force the aircraft off-course laterally, and the pilot should take position fixes periodically to determine his actual course and then correct his heading toward the original straight-line on-course path. The actual distance off course and the actual distance traveled between two position fixes can be measured on the chart by using the appropriate scale 31 or 32 on the ruler arm 14.

The scales 42 and 43 on the bottom of the plotter may be used to compute the wind correction angle according to the formula:

WCA (in degrees) = [distance off course/miles flown]×60.

The number representing the distance off course is read on the outer scale 42. Thenumber representing the miles flown by the aircraft since the last fix is read on the inner scale 43. The inner disc 12 is turned to bring these numbers in registration with one another. Then the user looks to the arrow marker at "60" on the inner scale 43, and he reads the number on the outer scale 42 that is now opposite this arrow. This last number is the wind correction angle, after selecting the location of the decimal point in this number.

After noting the direction, left or right, that the aircraft is off course, the pilot then replots the course from the position fix which was used to calculate the WCA and either adds or subtracts the wind correction angle to or from the angular setting of the ruler arm 14 along the scale 11 on the front plate 10, so as to compensate for the cross wind. For example, if the wind drift of the aircraft has been to the right, the WCA input to the plotter should be to the left so that by directing the aircraft along a new heading which includes this wind correction angle, the pilot causes it now to approach the original on-course, straight-line path.

The present plotter also may be used to facilitate landing an aircraft at a selected airport by minimizing the mental calculations the pilot is required to make.

First, the pilot determines from the Sectional Chart whether the traffic pattern is "left" or "right" for the airport where he is about to land. He aligns the arrow head 37 on the plotter arm 14 with the scale mark on the front plate scale 11 for the heading angle of the runway. Then he turns the back plate 15 with respect ot the front plate and the arm 14 so that its cross hair 23 registers with the radial line 35a on the arm 14. This puts the "left" and "right" arrows 28 and 29 on the back plate at opposite 45 degrees angles to the radial line 35a on arm 14.

If the chart says that the airport has a "left" traffic pattern, he turns the aircraft to a heading corresponding to that of the left arrow 28 entry angle. Then, as the aircraft gets closer to the runway he turns it 45° to the right, as designated by the position of the inner end of the radial arm slot 30 along the front plate scale 11. Then he turns the aircraft 90° to the left from downwind in the direction designated by the arrow head 21 at the edge of the back plate 15, for the base leg of the approach and then finally 90° to the left to the designated runway on which the pilot intends to land, which is designated on the front plate scale 11 by arrow head 37 on the arm 14.

Conversely, if the chart says that the airport has a "right" traffic pattern, the pilot first turns the aircraft to a heading corresponding to that of the "right" arrow 29, entry angle Then, as the aircraft approaches the runway he turns it 45° to the left as designated by the line inner end of slot 30 on arm 14 along the front plate scale 11, so that it is now heading downwind parallel to the runway. Then he turns it 90° to the right from downwind, in the direction along the front plate scale 11 designated by the arrow head 22 at the edge of the back plate 15 for the base leg of the approach, and then finally 90° to the right to the final approach to the designated runway on which the pilot intends to land, which is designated on the front plate scale 11 by the arrow head 37 on arm 14.

I claim:

1. In a radio navigation plotter for an aircraft or watercraft comprising:

a back plate and a front plate concentric with each other, said front plate having a 360° calibrated scale extending circularly about its center, and said back plate having a diametrical North-South line thereon, said back plate being rotatable with respect to said front plate about their common center to displace said North-South line angularly from alignment with the o–180 axis of said 360° scale on the front plate according to magnetic variation at a particular geographic location;

and an elongated arm pivoted on said plates to turn about their common center, said arm extending laterally beyond one side of the plates and presenting a straight edge which extends radially outward beyond said plates, said arm having a marker aligned with said straight edge and located at the opposite side of the common center of the plates to designate on said scale on the front plate an angle 180° from the angular position of said straight edge;

the improvement which comprises; a disc having a circular compass scale thereon concentric with said scale on the front plate and registering with the latter said disc being rotatable relative to said front plate about said common axis to displace said scale on the disc along said scale on the front plate in accordance with the magnetic heading of the craft; said marker on the arm being registrable with said scale on the disc in accordance with the relative bearing so as to designate on said scale on the front plate the magnetic bearing of the craft to the radio station.

2. A plotter according to claim 1 wherein:

said back plate has a pair of markers thereon extending radially outward from said common center at 45° angles respectively to the upper and lower portions of said North-South line on a common side of the latter 3. A plotter according to claim 1 wherein:

said front plate and said disc, on the opposite faces thereof from said compass scales, have identical logarithmic scales extending circularly adjacent one another and each calibrated from 10 to 100;

said front plate is transparent at said logarithmic scale on said disc;

and said back plate is transparent at said logarithmic scales on said front plate and said disc.

4. A plotter according to claim 3 wherein:

one of said logarithmic scales has a marker at the 60° location thereon.

5. In a radio navigation plotter comprising;

a back plate and a front plate concentric with each other, said front plate having a 360° calibrated scale extending circularly about its center, and said back plate having a diametrical North-South line thereon, said back plate being rotatable with respect to said front plate about their common center to displace said North-South line angularly from alignment with the 0–180 axis of said 360° scale on the front plate according to the magnetic variation at a particular geographic location, said front plate being transparent;

and an elongated arm pivoted on said plates to turn about their common center, said arm extending laterally beyond one side of the plates and presenting a straight edge which extends radially outward beyond said plates, said arm having a marker aligned with said straight edge and located at the opposite side of the common center of the discs to designate on said scale on the front plate an angle 180° from the angular position of said straight edge;

the improvement wherein;

said back plate has a pair of markers thereon extending radially outward from said common center at 45° angles respectively to the upper and lower portions of said diametrical North-south line on a common side of the latter

* * * * *